Figure 15:
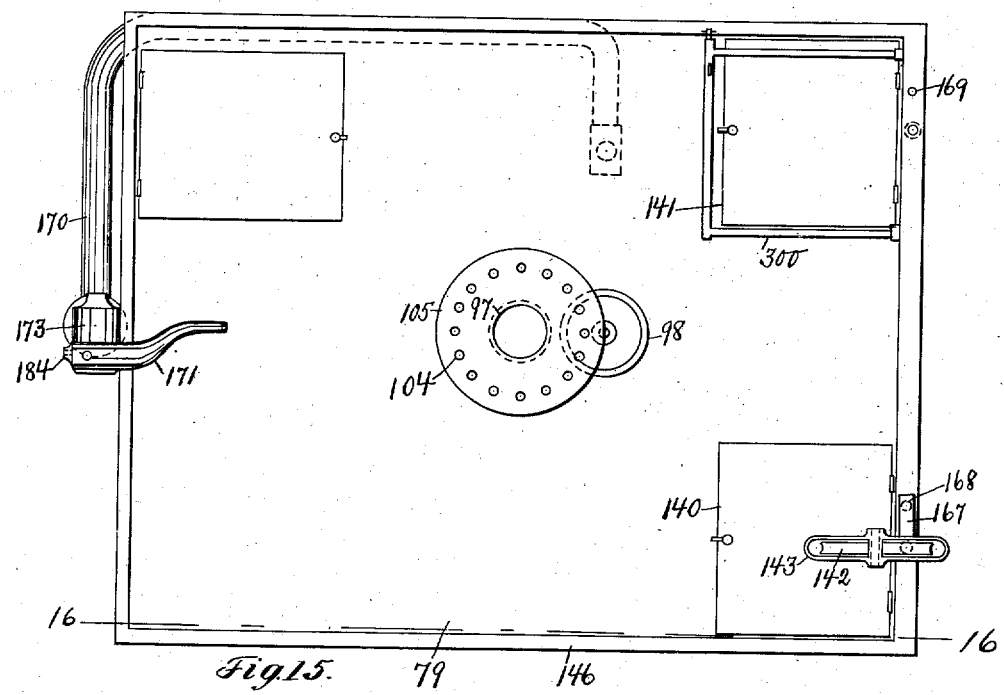

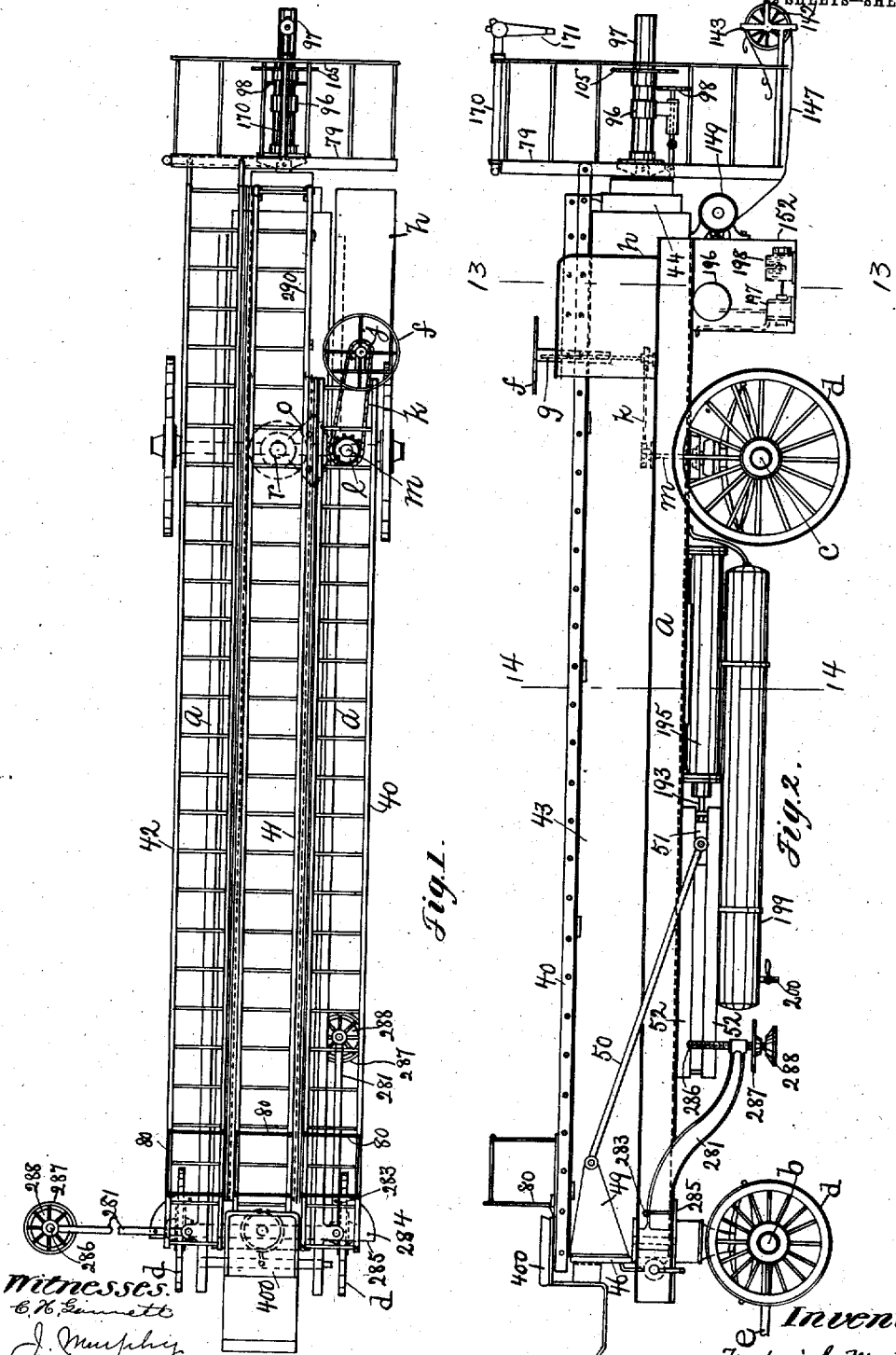

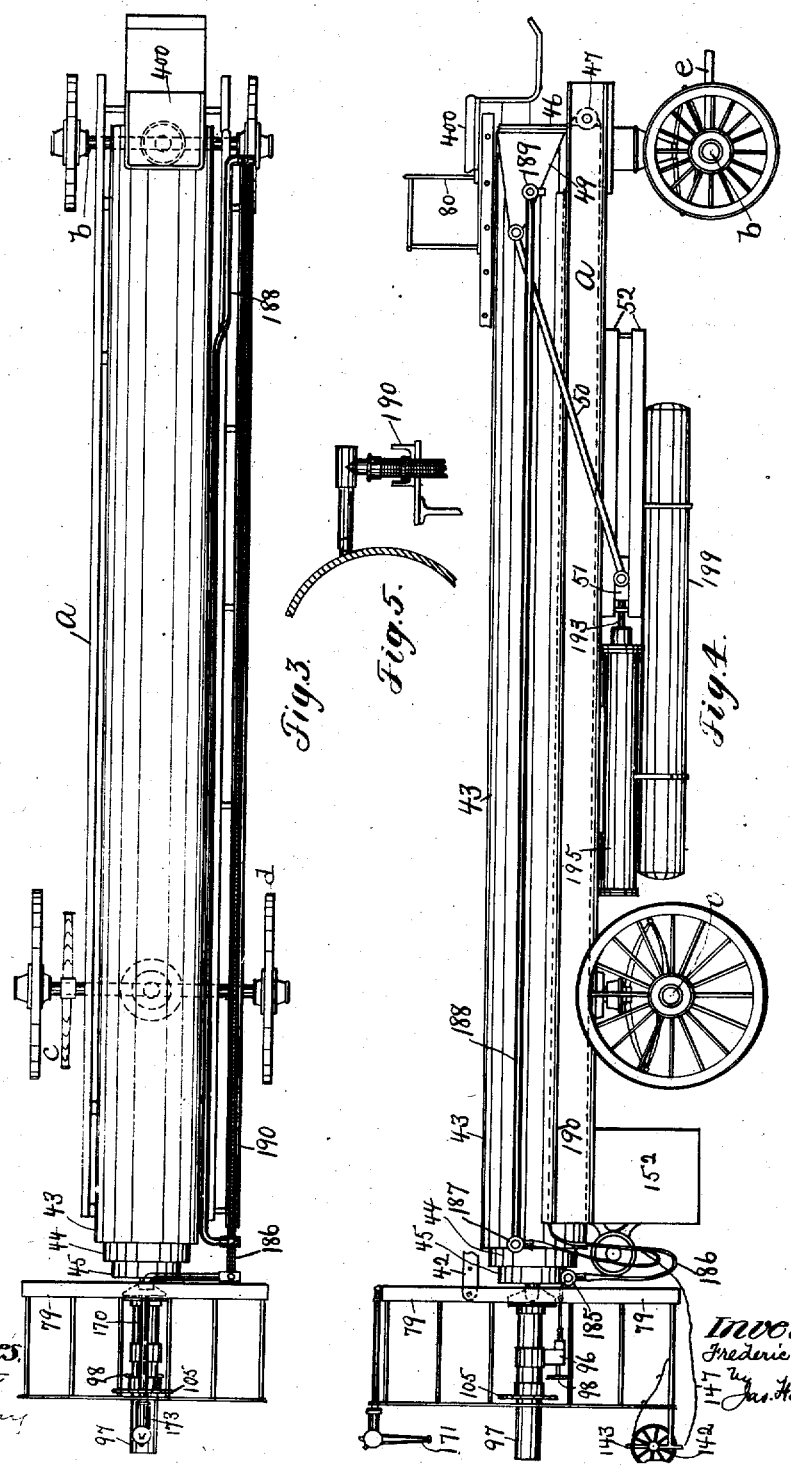

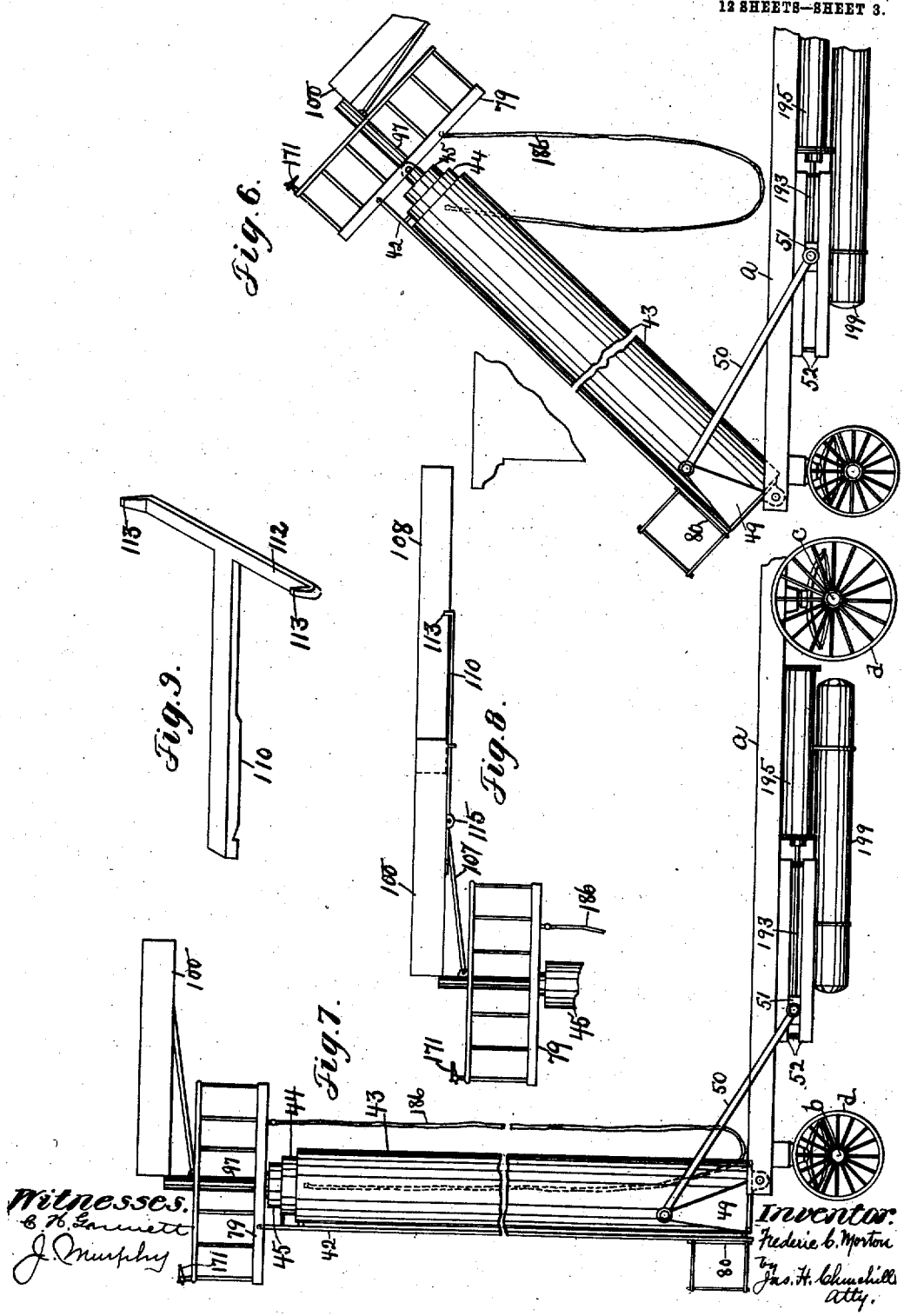

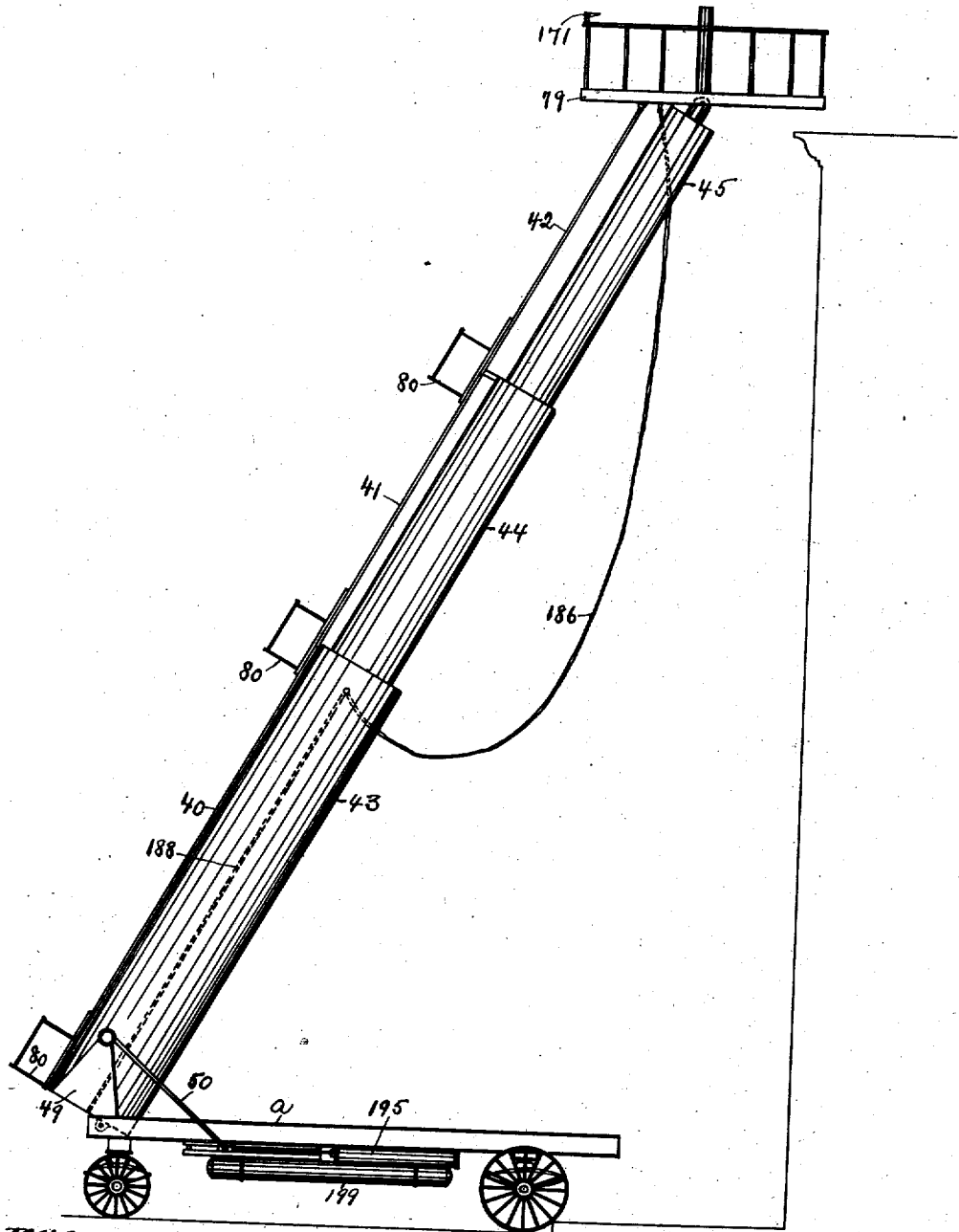

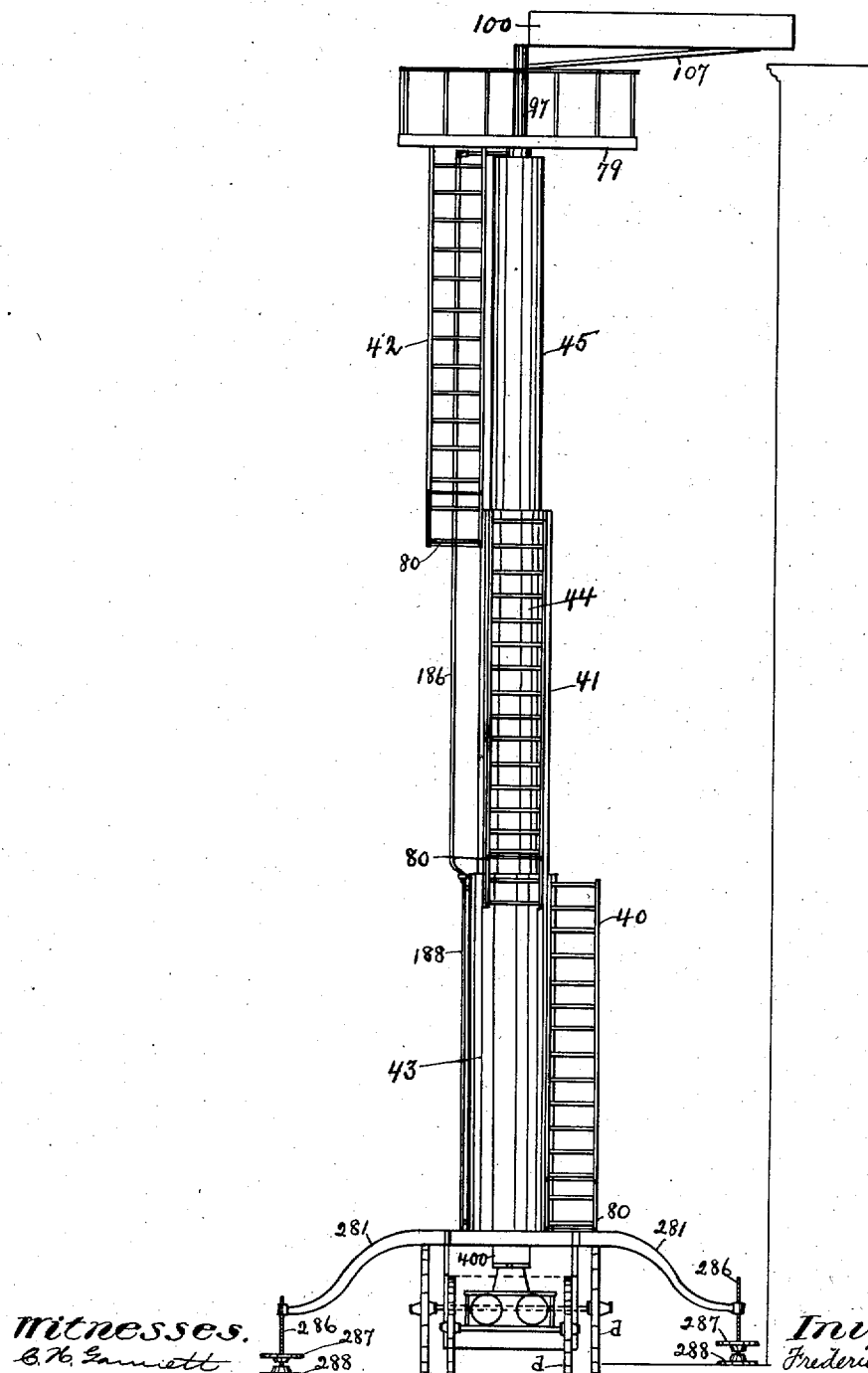

F. C. MORTON.
APPARATUS FOR FIGHTING FIRES.
APPLICATION FILED APR. 20, 1904.
966,346.
Patented Aug. 2, 1910.
12 SHEETS—SHEET 6.
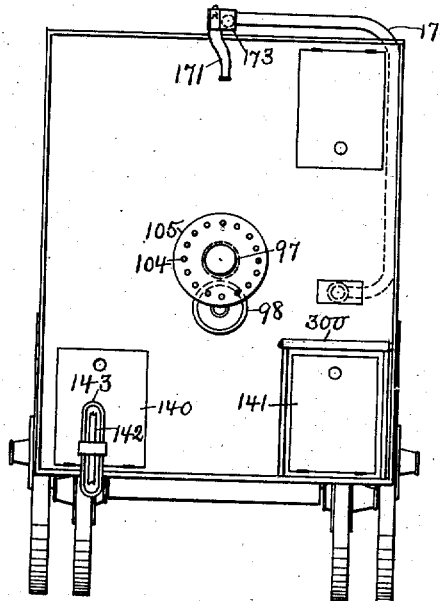
Fig. 12.
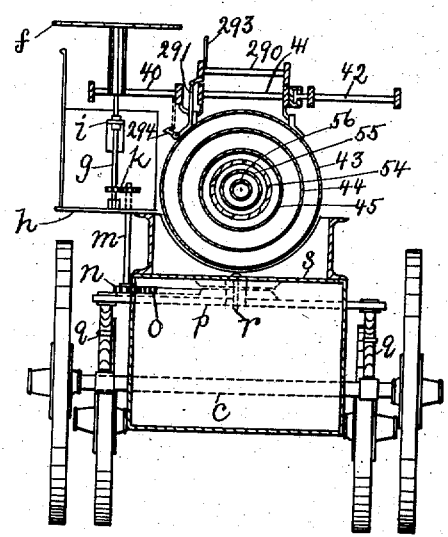
Fig. 13.
Fig. 14.
Witnesses.
Inventor:
Frederic C. Morton
by Jas. H. Churchill
Atty.

F. C. MORTON.
APPARATUS FOR FIGHTING FIRES.
APPLICATION FILED APR. 20, 1904.

966,346.

Patented Aug. 2, 1910.
12 SHEETS—SHEET 7.

Witnesses
C. N. Garnett
J. Murphy

Inventor.
Frederic C. Morton
by Jas. H. Churchill
atty.

F. C. MORTON.
APPARATUS FOR FIGHTING FIRES.
APPLICATION FILED APR. 20, 1904.
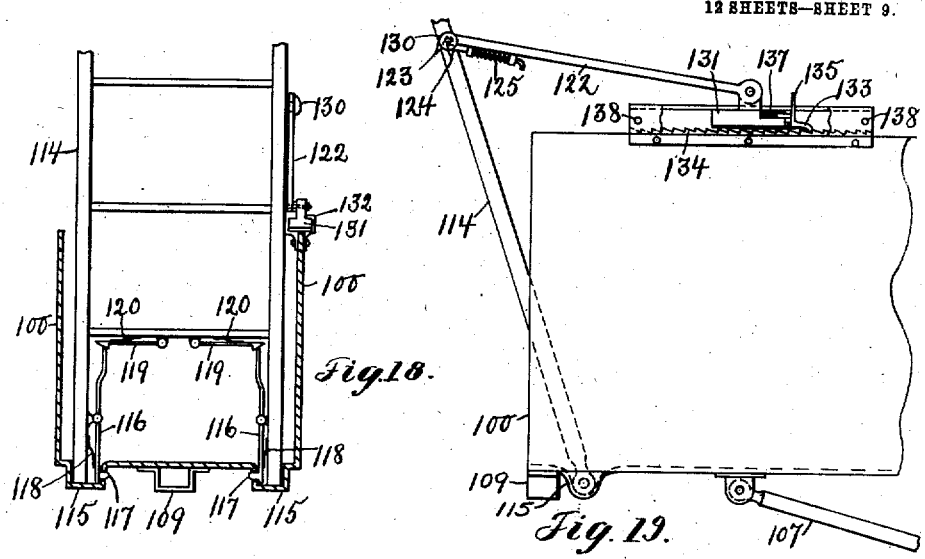
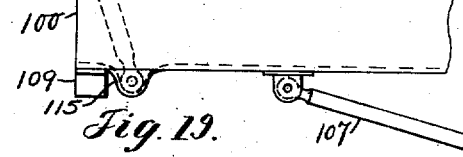
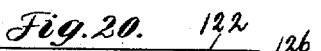
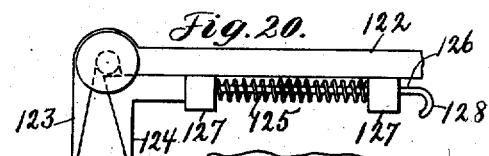
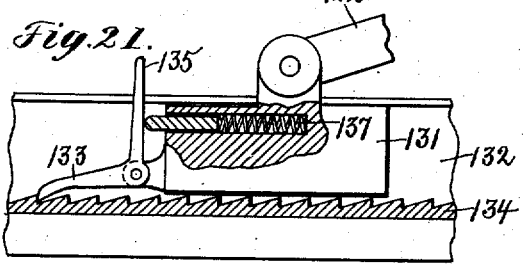
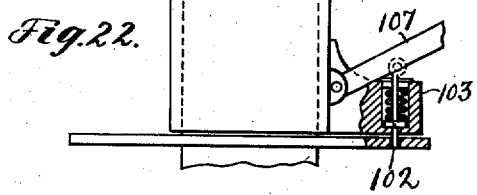
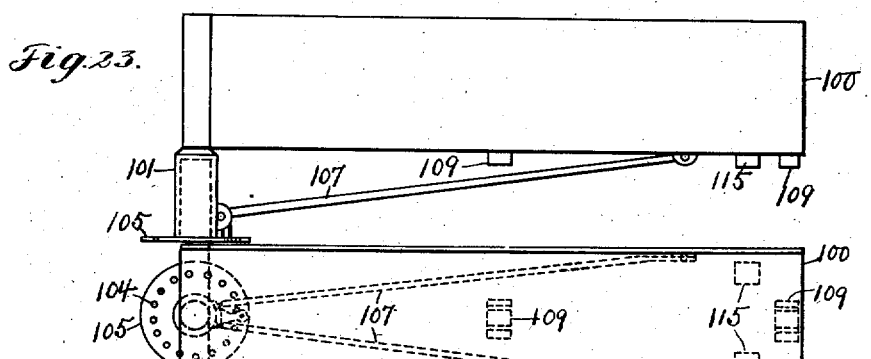

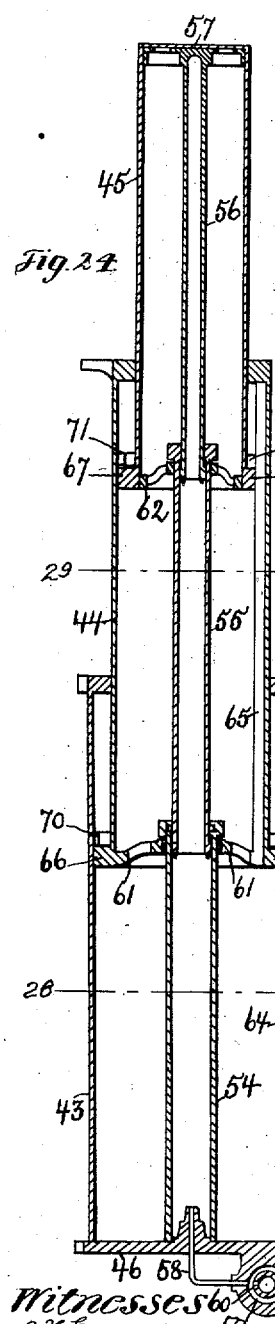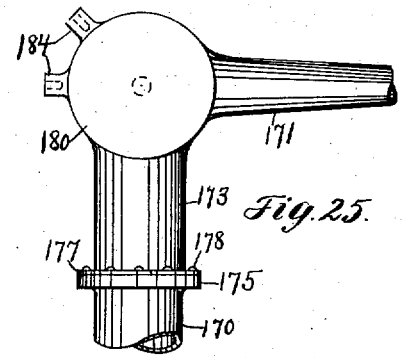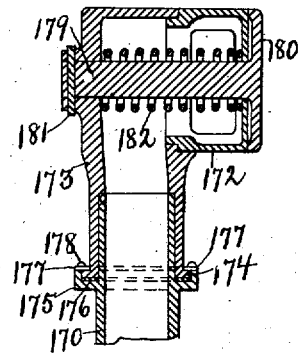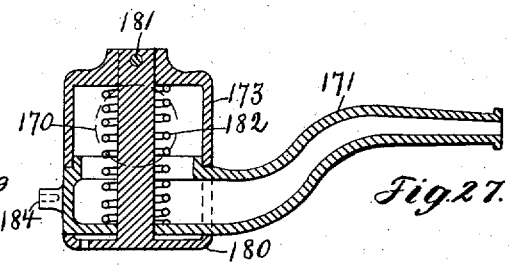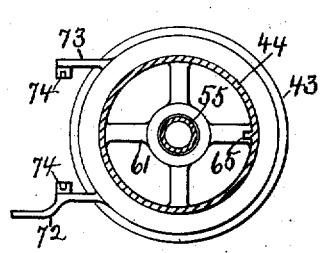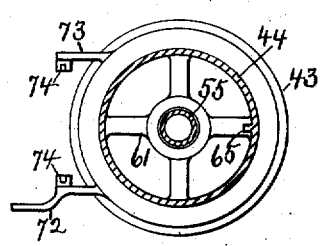

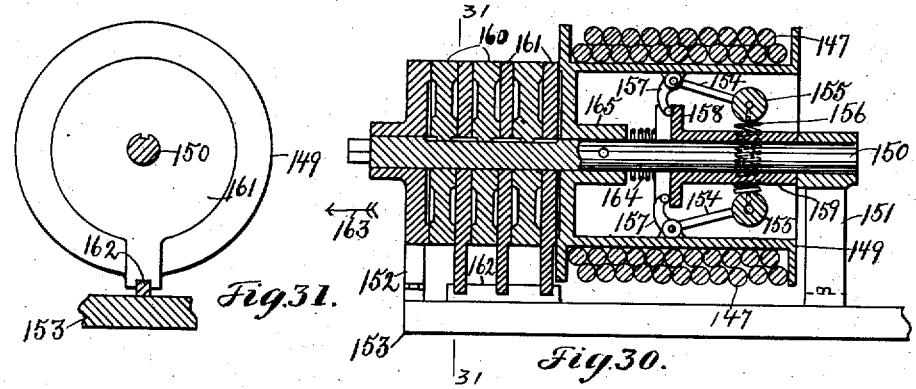
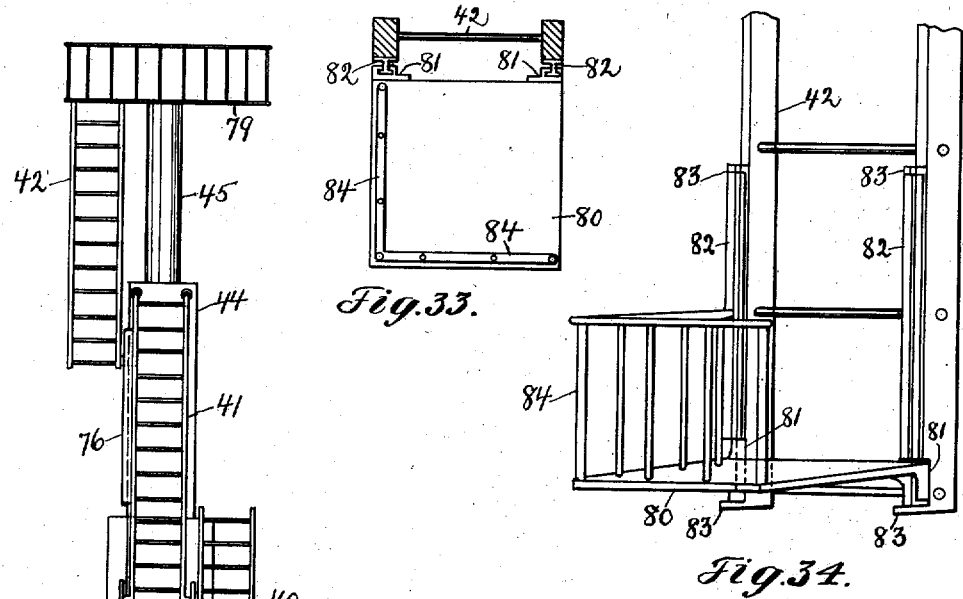
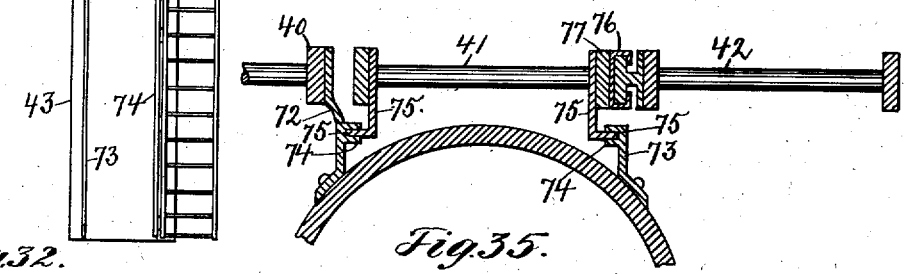

UNITED STATES PATENT OFFICE.

FREDERIC C. MORTON, OF CAMBRIDGE, MASSACHUSETTS, ASSIGNOR OF ONE-HALF TO WILLIAM E. BRAND, OF BOSTON, MASSACHUSETTS.

APPARATUS FOR FIGHTING FIRES.

966,346. Specification of Letters Patent. Patented Aug. 2, 1910.

Application filed April 20, 1904. Serial No. 204,015.

*To all whom it may concern:*

Be it known that I, FREDERIC C. MORTON, a citizen of the United States, residing in Cambridge, in the county of Middlesex and State of Massachusetts, have invented an Improvement in Apparatus for Fighting Fires, of which the following description, in connection with the accompanying drawings, is a specification, like characters on the drawings representing like parts.

This invention relates to a portable apparatus especially designed and adapted for use at fires in cities having high buildings. The apparatus referred to, may and preferably will be provided with an aerial ladder, a water tower, a working tower for firemen, and a fire escape, all of which are combined in a manner as will be described to form an effective piece of apparatus for fighting fires. For this purpose the working parts of the apparatus are carried by a vehicle, which may be drawn by horses or otherwise propelled, the body of the vehicle being preferably made of metal, such as channel iron beams. The body of the vehicle has pivotally secured to it at its front end, an extensible support for an extensible ladder, which latter may and preferably will be composed of sections laterally arranged with relation to each other, so that each ladder section may be used by the firemen and raised and lowered while so used, without danger of injury to the firemen. The extensible support for the extensible ladder, may be operated by power supplied from a suitable source carried by the vehicle, and provision is made for turning the support on its pivot so as to raise and lower the same and also for simultaneously elongating said support and the sections of the extensible ladder. The sections or individual ladders comprising the extensible ladder, may be provided with platforms, and the uppermost section of the extensible support may have secured to it a working platform, which may be capable of a tilting movement for a purpose as will be described, and which may have secured to it a nozzle, preferably capable of turning in substantially horizontal and vertical directions and which is connected by a flexible hose with a rigid pipe attached to the lowermost section of the extensible support. The working platform may also support a bridge or runway which is adapted to span the space between the said platform and a building, and said bridge may be provided with an extension or auxiliary bridge which is detachably secured to the main bridge. The main bridge may be pivotally supported to move in a substantially horizontal plane, so as to enable it to be adjusted to the portion of the building desired, as will be described. The working platform may be provided with means for lowering to the ground persons rescued from the building. Provision is made for bracing the vehicle laterally to support the apparatus in its raised position.

Other features of this invention will be pointed out in the claims at the end of this specification.

Figure 16:
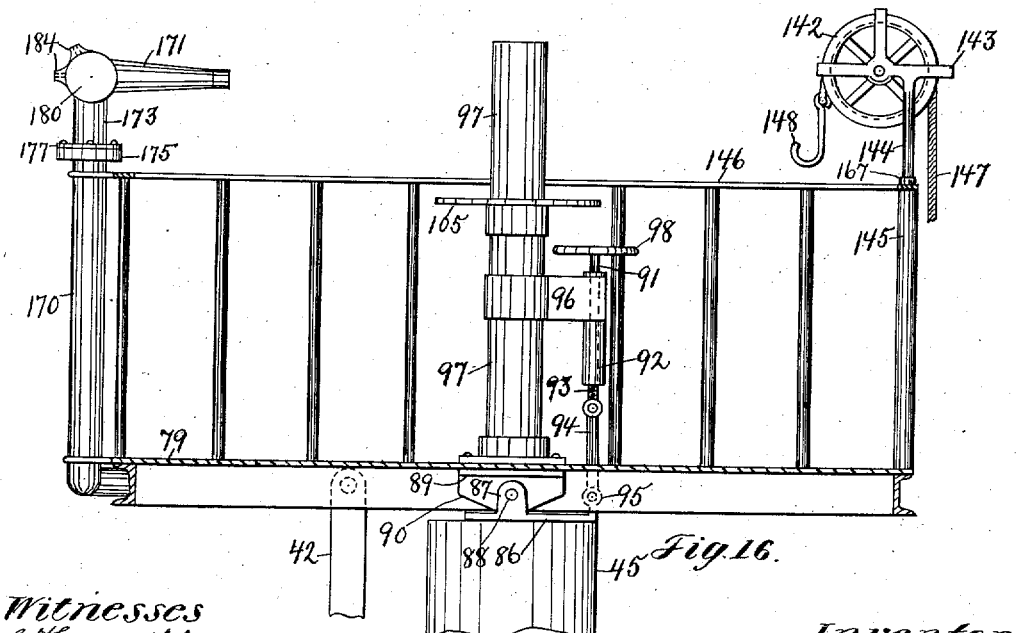
Figure 17:
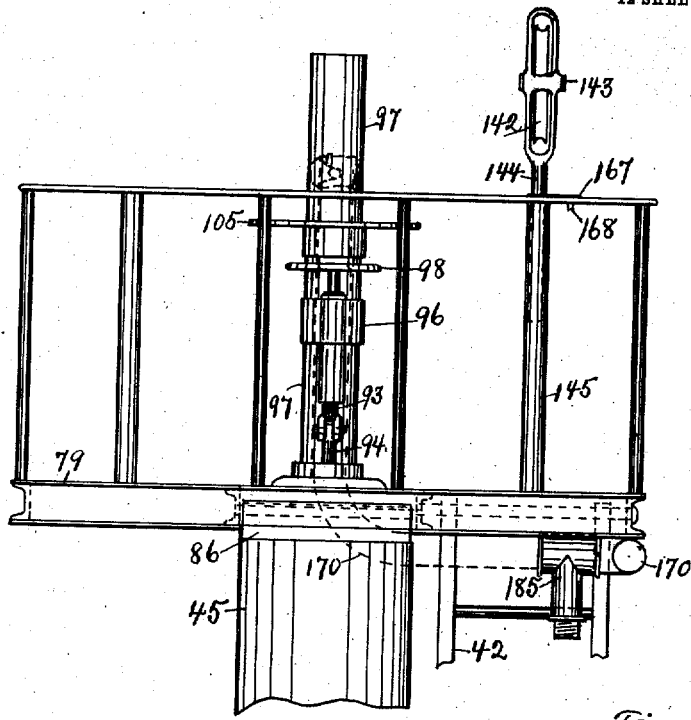
Figure 17A:
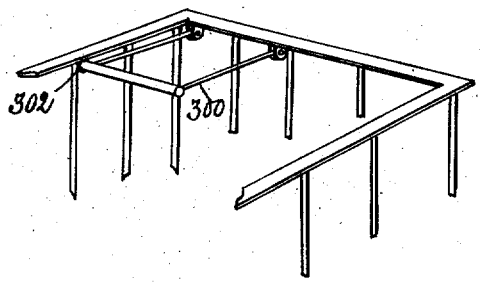
Figure 17B:
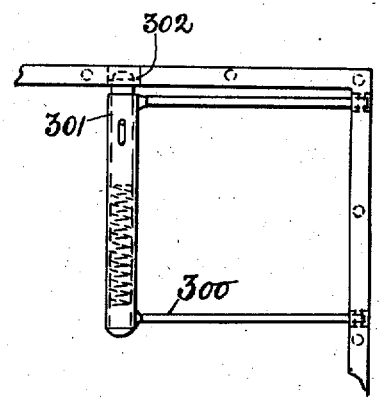

Figure 1 is a plan view of an apparatus embodying this invention. Fig. 2, a side elevation of the apparatus shown in Fig. 1. Fig. 3, a plan view of the apparatus with parts omitted. Fig. 4, a side elevation of the apparatus shown in Fig. 3. Fig. 5, a detail on an enlarged scale to be referred to. Figs. 6 and 7, details in side elevation to illustrate the operation of the apparatus. Figs. 8 and 9, details to be referred to. Fig. 10, a side elevation of the apparatus in its extended operative position. Fig. 11, a front elevation of the apparatus in its extended operative position. Fig. 12, a rear elevation on an enlarged scale of the apparatus in its lowered position. Fig. 13, a cross-section on an enlarged scale taken on the line 13—13, Fig. 2. Fig. 14, a cross-section on an enlarged scale taken on the line 14—14, Fig. 2. Figs. 15 and 16, details in plan and side elevation on an enlarged scale of the working platform to be referred to. Fig. 17, a side elevation of the working platform looking toward the left in Fig. 16. Figs. 17a and 17b, details to be referred to. Figs. 18, 19, 20 and 21, details on an enlarged scale of the bridge and ladder to be referred to. Figs. 22, 23 and 23a, details of the bridge to be referred to. Fig. 24, a vertical section of the telescopic plunger in its extended position and on an enlarged scale. Figs. 25, 26 and 27, details of the nozzle carried by the working platform. Fig. 28, a cross-section on the line 28—28, Fig. 24. Fig. 29, a cross-section on the line 29—29, Fig. 24. Figs. 30 and 31, details of the drum and friction brake therefor to be referred to, Fig. 31 being a section on the line 31—31, Fig. 30. Fig. 32, a detail of the ladders in their extended or operative position. Figs. 33 and 34, details of the ladder platforms. Fig. 35, a sectional detail to be referred to, and Fig. 36, a diagrammatic view to illustrate the operation of the apparatus.

Referring to Figs. 1 to 4 inclusive, $a$ represents the body portion of a vehicle mounted upon a front axle $b$ and a rear axle $c$, each provided with wheels $d$. The front axle $b$ is provided as shown with a pole $e$, and is capable of being turned in the usual manner. The rear axle $c$ is also capable of being turned by a steersman operating a wheel $f$ detachably affixed on an upright shaft $g$ supported above the body $a$ and connected by suitable mechanism with the rear axle $c$. The said mechanism may be of any desirable or suitable construction, and as herein shown consists of the shaft $g$ supported by a platform $h$ for the steersman (see Figs. 1 and 13) and by a bracket $i$ attached to an upright wall of the platform $h$, which latter is supported by the body $a$ of the vehicle and projects laterally therefrom as shown in Fig. 13. The shaft $g$ is provided with a sprocket wheel $j$, which is connected by a link chain $k$ with a sprocket wheel $l$ on a second shaft $m$ (see Figs. 1 and 2). The shaft $m$ is provided at its lower end with a pinion $n$, which meshes with a segmental gear $o$ attached to a cross bar $p$ supported from the rear axle $c$ by the springs $q$. The cross bar $p$ is pivotally connected by the bolt or pin $r$ with a cross bar $s$ forming part of the body of the vehicle. The hand wheel $f$ may have a square socket to fit the square end of the shaft $g$.

The body $a$ of the vehicle may be made of metal, preferably channel iron, to obtain strength and lightness. The body $a$ carries preferably a plurality of ladders 40, 41, 42, which coöperate to form an extension ladder and which are secured to a suitable support carried by said vehicle. The support for the ladders 40, 41, 42, may and preferably will be extensible and comprises in the present instance three parts or sections 43, 44, 45 (see Figs. 10, 11, and 24), which may be made tubular in form and adapted to telescope one within the other.

The extensible support for the ladders which will be hereinafter designated the support, is pivotally connected with the body $a$ of the vehicle, so that the said support with its attached ladders may be turned from a substantially horizontal position, shown in Figs. 1 and 2, into a substantially vertical position shown in Fig. 7. In the present instance, the support for the ladders is shown as pivoted to the front end of the vehicle, and for this purpose, the larger section of the support may be provided with a cap or head 46 (see Figs. 2 and 24) having one or more lugs 47, through which are extended the pivot pin or shaft 48, which is supported by the side bars of the vehicle body. The support is adapted to be turned from a substantially horizontal position shown in Figs. 1 and 2, into a substantially vertical position shown in Figs. 6 and 7, and for this purpose, the cap or head 46 may be provided at opposite sides of the said support, with crank brackets or arms 49, which are joined by connecting rods 50 with a cross head 51 which moves in suitable guide bars or pieces 52 attached to the underside of the vehicle body. The support may be extended from the position shown in Fig. 2 to that shown in Fig. 11, by an actuating device which is power-operated. The actuating device referred to, may and preferably will be made as herein shown and consists of a telescopic plunger comprising in the present instance three tubular sections 54, 55, 56 (see Fig. 24) located within corresponding sections of the support. The lowermost section 54 of the plunger is secured to the cap or head 46 and the outermost section 56 is secured to a head 57 fastened to the outermost section 45 of the support. The plunger is closed at its outer end and is open at its inner or lower end, which communicates with a source of fluid supply, to be described, through a pipe 58 (see Fig. 24) connected with an annular chamber 59 within the hollow boss 47. The chamber 59 communicates through a port 60 with the interior of the hollow shaft or pivot pin 48. Suitable packing not herein shown is provided to render fluid tight, the joint between the hollow boss 47 and the hollow pivot shaft or pin 48. The section members or parts of the telescopic plunger may be supported centrally within the extensible support by suitable guides, herein shown as disks or spiders 61, 62, the disk 61 being attached to the bottom of the intermediate section 44 of the support, and the disk 62 attached to the intermediate section 55 of the plunger near its top (see Fig. 24). Provision is made for preventing the outermost and intermediate sections of the support from rotating or turning, and this may be accomplished as herein shown, by keys 64, 65 attached to the lowermost and intermediate sections 43, 44 of the support, which engage suitable notches in bottom flanges 66, 67 on the intermediate and outermost sections 44, 45 of the support.

The disk 61 is attached to the intermediate section 44 of the support and slides on the lowermost section 54 of the plunger, and the disk 62 attached to the intermediate section 55 of the plunger slides within the outermost section 45 of the support. It will thus be seen that the movable sections of the plunger are centrally supported within the extensible support.

Provision is made for limiting the outward movement of the movable sections 44, 45 of the support, and this may be accomplished as herein shown by stops 70, 71 affixed to the inner side of the sections 43, 44 of said support, which are engaged by the flanges 66, 67 on the sections 44, 45. The sections 43, 44, 45 of the support have secured to them as will now be described, the ladders 40, 41, 42. Referring to Figs. 32 and 35, the ladder 40 has one of its side bars fastened to a bracket 72 which is riveted or otherwise secured to the stationary section 43 of the support, and which coöperates with a second bracket 73 likewise secured to said support. The brackets 72, 73 extend substantially the length of the stationary support as shown in Fig. 32 and are provided with ribs 74 forming guideways or grooves in which slide lugs 75 attached to the sides of the intermediate ladder 41 at or near its lower end, the said intermediate ladder being suitably fastened at or near its upper end to the intermediate section 44 of the support. The intermediate ladder has secured to its side remote from the stationary ladder 40, a guideway 76 which extends substantially the length of the ladder, and in which slides a guide, lug or arm 77 (see Fig. 35) attached to one side of the ladder 42 at or near its lower end. The ladder 42 is connected with the outermost section 45 of the support so as to move therewith, and this may be accomplished as herein shown, by pivotally connecting the upper end of the ladder 42 with a large platform 79 which may be designated a working-platform, which is secured as will be described to the outermost section 45 of the support. Each of the ladders may be provided at its lower end with a platform 80, which may and preferably will have a sliding engagement with the ladder, which may be accomplished as shown in Figs. 33, 34, by providing each of the platforms on its rear side with slotted metal pieces 81, which engage substantially T-shaped metal bars 82 secured to the sides of the ladder. The metal bars 82 are provided at their opposite ends with lugs or projections 83 which form stops to limit the movement of the platform longitudinally of the ladder. The platform 80 may be provided with a railing 84 on its front and one side, so as to leave one side of the platform open, for the passage of a fireman or other person onto an adjacent ladder. The working-platform 79 is made large enough, so as to afford opportunity for a number of firemen to work thereon, and said working platform may and preferably will be pivotally connected to the top of the section 45 of the support for the ladders.

In the present instance, the section 45 of the support is provided with a cap plate or piece 86 (see Figs. 16 and 17) having lugs or ears 87 through which are extended a pivot pin 88 supported by the floor irons or beams of the platform 79.

The platform 79 has secured to its underside a plate or bar 89 provided with end flanges 90 through which the pivot pin is extended, and which form bearings for the pivot pin. The platform 79 is adapted to be tilted in a vertical direction and this tilting action may be effected by mechanism such as herein shown and which consists of a rotatable shaft or spindle 91 provided with a threaded socket 92 (see Fig. 16), into which extends a threaded rod 93 joined by a link 94 to a lug 95 on the cap plate 86. The shaft or spindle 91 is rotatably supported in a bracket or arm 96 which is suitably fastened to a center post or standard 97, riveted or otherwise fastened to the upper surface of the floor of the platform 79. The shaft or spindle 91 is provided as shown with a hand wheel 98, by turning which the threaded rod 93 is moved into or out of its socket and the platform thereby tilted on the pin 88 as a center. The platform 79 is thus capable of being adjusted, so that it can be maintained substantially horizontal when in its elevated position. The upright post 97 constitutes a pivotal support for a bridge or runway 100, which may be made as herein shown and comprises a bottom and side pieces (see Fig. 23ᵃ). The bridge 100 has depending from it at or near one end a socketed hub or boss 101 which is designed to be fitted over the upper end of the post 97 so as to turn thereon, thereby permitting the bridge to be moved in a circular path in a horizontal plane, and enabling it to be adjusted with relation to the building in which a fire occurs, so as to bring the bridge opposite or in line with a window if desired. Provision is made for locking the bridge in a fixed position with relation to the upright or post 97, which may be accomplished, as herein shown (see Figs. 22 and 23), by a spring-actuated bolt 102 carried by a lug or arm 103 on the hub or boss 101 of the bridge and adapted to enter one of a series of holes 104 in a circular plate or flange 105 fastened to the post or upright 97. The bridge 100 is designed to project beyond the working-platform and to reach in some instances to the roof of a building as represented in Fig. 11, or it may be to a window of the building, thereby affording means of escape from the building to the working platform. The free end of the bridge 100 may be supported by rods or bars 107 connected to the underside of the bridge at one end, and to the hub or boss 101 at the other end as shown in Fig. 23. In some instances the bridge 100 may not be sufficiently long to reach the building, and in this case, an extension or auxiliary bridge 108 is provided, (see Fig. 8) which may be supported by the main bridge as will be described. For this purpose, the main bridge 100 is provided on its underside with substantially U-shaped hangers 109 (see Figs. 18 and 23) between which and the bottom of the bridge is inserted a bar 110 provided at its outer end with a cross bar 112 having upturned lugs or arms 113 which are adapted to engage the sides of the auxiliary bridge as shown in Fig. 8. The bar 110 is made of sufficient length to cause the cross bar 112 to engage the bottom of the auxiliary bridge, preferably beyond the longitudinal center of said auxiliary bridge. Provision is also made for supporting a short ladder 114 from the front of the bridge 100, and for this purpose, the bottom of said bridge is provided with two rounded or cup-shaped sockets or depressions 115 (see Fig. 18) into which the lower ends of the side pieces of the short ladder 114 may be inserted, and in which the ladder may be turned to adjust it to the building. Provision is made for locking the ladder 114 to the bridge and this may be accomplished as herein shown (see Fig. 18) by means of latches 116 pivotally secured to the sides of the ladder and provided with projections or studs 117, which are forced by springs 118 into suitable holes or openings in the inner side wall of the sockets 115 as clearly represented in Fig. 18.

The latches 116 may be disengaged from the bridge by hand, and held in their disengaged position by supplementary latches 119 herein represented as pivoted to a rung of the ladder and adapted to engage the tail pieces of the main latches, with which they are held in engagement by springs 120 until positively released by hand. The latches 116 serve to lock the lower end of the ladder to the bridge, yet in such manner as not to interfere with the pivotal movement of the ladder. The upper end of the ladder 114 is designed to rest against the building when in use, and to prevent the upper end of the ladder from being accidentally moved backward toward the bridge, a holding device or brace is provided which engages the side of the ladder intermediate its ends, and which is preferably made adjustable as will be described.

The holding device or brace may be made as herein shown (see Figs. 19, 20 and 21) and consists of a rod or bar 122 provided with a fixed jaw 123, with which coöperates a movable jaw 124 carried by the rod or bar 122 and normally moved toward the fixed jaw 123 by a spring 125, which encircles the shank 126 of the movable jaw between the lugs 127 on the rod or bar 122. The shank 126 slides in the lugs 127 and is provided as shown with a bent end or finger piece 128, which is designed to be grasped by the fireman when it is desired to release the ladder from the holding device. The jaws 123, 124 are adapted to engage a pin or button 130 on a side piece of the ladder.

The rod or bar 122 may be adjustably connected with a side of the bridge 100, which may be accomplished as herein shown (see Figs. 19 and 21) and for this purpose the said rod or bar is connected with a sliding block 131 movable in a suitable guideway 132 attached to the side of the bridge. The sliding block 131 carries a pawl 133 which is designed to engage a ratchet 134 attached to said guideway. The pawl 133 may be provided with a finger or arm 135 by which the said pawl may be disengaged from its ratchet with which it is held in engagement by the spring 137. Suitable stops, shown as pins 138 are carried by the guideway at or near its opposite ends to limit the movement of the sliding block in said guideway.

Provision is made for enabling persons rescued from a burning building to be lowered to the ground with safety and expeditiously, and to this end, the working platform is provided with trap doors 140, 141 at opposite sides of the platform near one end, (see Fig. 15) and is further provided with a sheave or pulley 142 mounted to turn in a frame 143 having a stem or shank 144, which is inserted into a hollow post 145 forming one of a series of upright supports for a railing 146 extended around the platform. The hollow posts 145 are arranged adjacent to and preferably in the same plane with the trap doors 140, 141, so that the person rescued may be lowered through the opening normally covered by the trap doors, by means of a rope or cable 147 which is passed over the sheave or pulley 142 and is provided with a hook or other device 148, which may be engaged with a belt or other suitable harness applied to the person to be lowered, especially when in a disabled condition. The rope or cable 147 has its opposite end attached to a drum 149 carried by the vehicle (see Fig. 2), and upon which the said cable is normally wound. The drum 149 is fast on a shaft 150 (see Fig. 30) having bearings in uprights 151, 152 attached to a stationary part of the vehicle, herein shown as a wall of a case 153 depending from the rear portion of the vehicle (see Fig. 2). The cable 147 may be wound upon the drum by hand, and unwound by the weight of the person being lowered. Provision is made for preventing the person being lowered at an excessive speed, and to this end, a friction brake is provided, which is automatically brought into action when the speed of the drum exceeds a predetermined point.

One form of friction brake is shown in Fig. 30, wherein the drum is shown as having pivoted to its inner circumference elbow levers 154 having weights 155 on their long arms which are connected by a helical spring 130

156, the short arms 157 of said levers engaging a flange 158 on a sleeve or hub 159, which is mounted loosely on the shaft 150 and bears against the standard or upright 151. The shaft 150 has mounted on it between the drum 149 and the bearing 152, a plurality of disks 160, 161, alternate disks 160 being keyed to slide on the shaft 150 and the disks 161 being loose on the said shaft to move longitudinally thereon, but restrained from rotation by engagement with a fixed key 162 on the support or case 153. In practice the drum 149 is preferably provded with two sets of levers 154 located on opposite sides of the shaft. In operation, when a person is attached to the upper free end of the rope and is lowered by gravity, the rope is unwound from the drum, and if the speed at which the drum turns exceeds a predetermined point, the weighted levers move the drum and shaft longitudinally in the direction indicated by the arrow 163, Fig. 30, thereby causing frictional resistance to the rotation of the drum, between the drum and disks 160, 161, which resistance retards the drum in its rotation and thereby prevents it from rotating at a materially greater speed. Provision is also made for keeping the rope taut under normal conditions, which may be effected by a substantially light spring 164 encircling the shaft 150 between the sleeve 159 and the hub 165 of the drum. In practice, the rope 147 will be made of a length equal in amount to several times the height of the platform from the ground, so that a number of persons may be consecutively lowered without the necessity of rewinding the rope, said rope being provided at suitable intervals with suitable devices, such as rings or links for attachment of the persons to be lowered. The sheave or pulley 142 is kept in its proper position with relation to the trap door in the working platform in any suitable manner, and in the present instance the spindle 144 of the frame in which the pulley is mounted, is provided with an arm 167 having a pin 168 (see Fig. 17), which extends through an opening 169 in the top rail of the platform.

The working platform 79 may be provided with a stand pipe 170 having a nozzle 171 movably attached to it and capable of being turned in a substantially vertical and horizontal plane. The nozzle 171 may be made as herein shown and comprises the nozzle proper having a laterally projecting hub 172 (see Figs. 26 and 27) which fits into a lateral opening in a vertically arranged section 173, which latter is fitted to turn or rotate on the upper end of the stand pipe 170. The nozzle 171 is capable of being moved in a substantially vertical plane, and the section 173 is rotatable and thereby moves the nozzle in a substantially horizontal plane. The vertical section 173 of the nozzle is provided as shown with a flange 174 which rests upon a flange 175 on the stand-pipe, a spring washer 176 being interposed between said flanges. The vertical section 173 is secured to the stand-pipe by a sectional ring 177, which is secured to the flange 175 by bolts 178 or otherwise. The nozzle proper 171 is secured to the vertical section 173 by a shaft or pin 179 having a head 180 which engages the nozzle 171, the said shaft or pin being secured to the section 173 by a key 181 (see Fig. 26). The shaft or pin 179 is encircled by a spring 182, which maintains the nozzle in engagement with the head 180 of the shaft or pin 179, with sufficient friction to keep the nozzle in the position into which it may be turned or adjusted.

By reference to Fig. 26, it will be seen that the water pressure also serves to create friction between the nozzle and the head of the pin 179 and also between the flange 174 and the ring 177. The hub of the nozzle 171 may be provided with one or more socketed lugs 184 (see Fig. 25), for the reception of a suitable tool or handle, by which the nozzle may be easily turned in a horizontal or vertical direction. The nozzle 171 is bent or curved so that its discharge or outlet end is in line with the center on which the nozzle turns either in a horizontal or vertical direction, thereby preventing a tendency for the nozzle to be moved by water pressure from the position in which it is placed.

The stand-pipe 170 is provided with a substantially horizontal section which is located beneath the platform and suitably secured thereto, said horizontal portion having a T-coupling 185 (see Fig. 17), which is mounted to turn thereon and with which is detachably connected one end of a flexible pipe or hose 186, the other end of which is detachably connected to a like coupling 187 on one end of a rigid pipe 188 (see Figs. 3 and 4), which is affixed to the lower section 43 of the extensible support for the ladders. The rigid pipe 188 is provided at its opposite end with a T-coupling 189 mounted to turn thereon, and which is connected by a flexible pipe or hose (not shown) with a hydrant or fire engine (not shown).

Provision is made for supporting the flexible hose 186 when the apparatus is in its normal or lowered position, and for this purpose, the vehicle body *a* has attached to its side below the rigid pipe 188 a trough or receptacle 190 extended lengthwise of the vehicle, said trough being open at its top to permit the flexible hose to be laid or folded into it, after the manner represented in Figs. 3, 4 and 5, wherein the flexible pipe 186 is represented as formed into a top and bottom layer, the latter being connected with the stand-pipe on the working platform and the former being connected with the rigid pipe 188 attached to the extensible support 43, so that when the said support is elevated and extended to raise the working platform, into the positions represented in Figs. 6, 7, 10 and 11, the hose 186 will be lifted out of the trough 190 and will follow the movement of the working platform without danger of becoming entangled. The pivotal couplings 185, 187 permit the hose to hang to the best advantage.

The apparatus above described is designed to be moved into its operative position by power operated mechanism carried by the vehicle. This mechanism may and preferably will be such as shown in the diagrammatic view Fig. 36, a portion only of the mechanism shown in Fig. 36 being shown in Fig. 2, to avoid confusion in the drawings.

Figure 36:
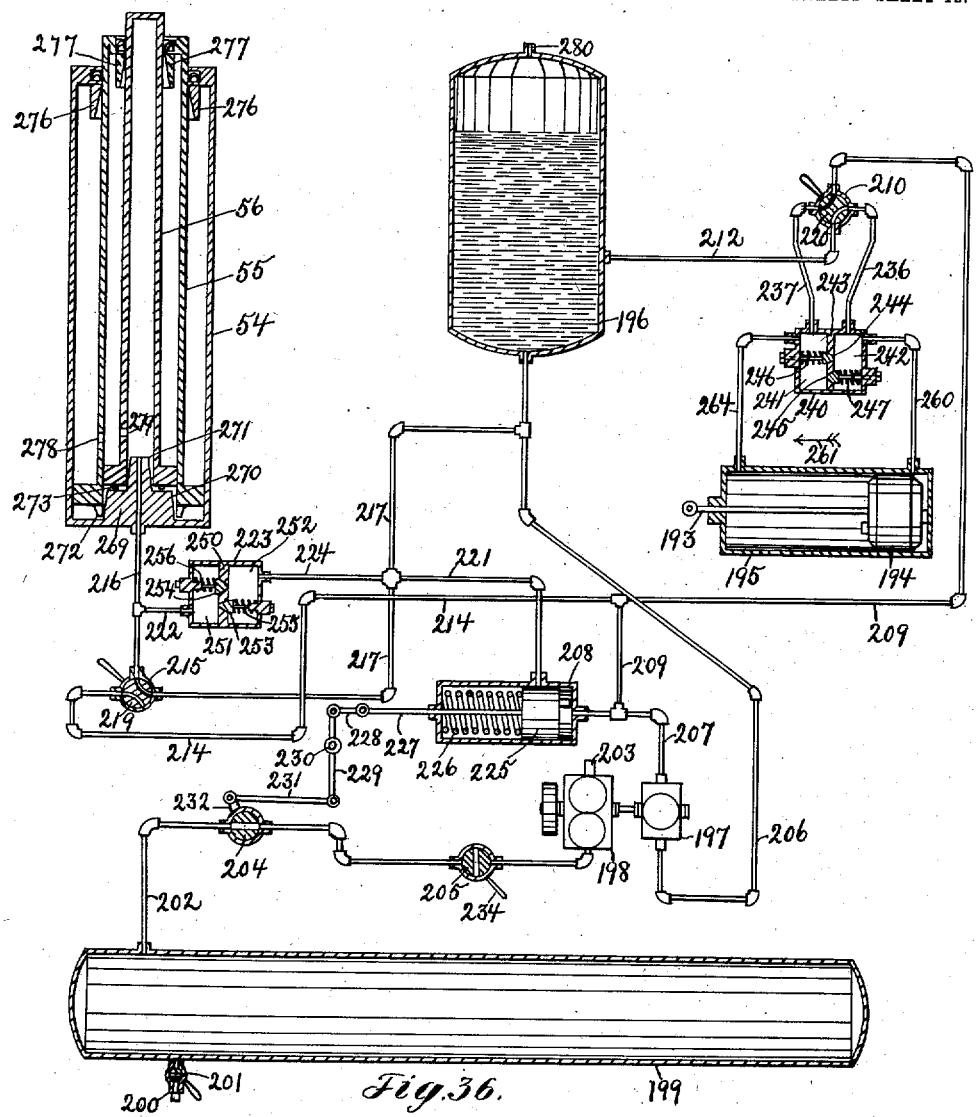

Referring to Figs. 2 and 36, the pivoted section 43 of the extensible support is connected by the cranks or arms 49 and connecting rods or bars 50 with the sliding cross head 51, to which is joined the piston rod 193 of a piston 194 reciprocating in a cylinder 195, which may be designated the elevating cylinder. The cylinder 195 is connected with a source of liquid supply, shown as a tank or reservoir 196, from which oil or other incompressible liquid is withdrawn by a pump 197 and forced into the cylinder 195 under conditions as will be described. The pump 197 is driven by an engine 198 operated by compressed air contained in a reservoir or tank 199. The pump 197 is connected with the telescopic plunger to supply liquid thereto and provision is made for returning the oil or liquid from the telescopic plunger to the reservoir 196. Hand operated valves are provided for positively controlling the operation of the pump and engine, and automatic valves are likewise provided to safeguard the apparatus.

In Fig. 36, I have shown one arrangement of pipes, valves, and apparatus, which I may prefer, and which will now be described more in detail. The air reservoir 199 has an inlet pipe 200 provided with a valve 201, and has an outlet pipe 202, which is connected with the engine 198, the latter having an exhaust pipe 203. The pipe 202 is provided with valves 204, 205. The pump 197 has its suction side connected by the pipe 206 with the bottom of the liquid reservoir 196 and has its discharge side provided with an outlet pipe 207, which is connected to one end of a cylinder 208 and connected by the pipe 209 with a valve casing 210 which is connected by the pipe 212 with the liquid supply tank. The pump 197 is also connected with the telescopic plunger by a pipe 214, valve casing 215 and pipe 216, which latter represents the hollow pivot 48 and pipe 58, shown in Fig. 24. The valve casing 215 is connected by the pipe 217 to the outlet pipe 206 for the tank 196. The valve casing 215 is provided with a four-way valve 219, which, when turned in one position, connects the pump with the telescopic plunger, and in another position with the tank 196. The valve casing 210 is provided with a four-way valve 220, which when turned into one position connects the pump with one side of the elevating cylinder 195 and the other side of said cylinder with the liquid tank 196. The cylinder 208 of the relief valve is connected by the pipe 221 with the pipe 217 leading to the liquid supply tank. The extensible plunger is connected with the supply tank by a pipe 222, casing 220 of double relief valve and pipes 224, 217. The cylinder 208 contains a piston valve 225 normally forced toward the liquid inlet end of the cylinder by a spring 226 which encircles the piston rod 227, the latter being extended outside of the cylinder and joined by a link 228 to one end of a lever 229 pivoted at 230 and having its opposite end connected by a link 231 with a crank or arm 232 on the valve 204 located in the pipe 202. The valve 205 in the pipe 202 is normally closed and has a handle 234. The casing 210 of the four-way valve 220 is connected by the pipes 236, 237 with the casing 240 of a double relief valve, the casing 240 being divided into two compartments 241, 242 by a partition wall 243 having two ports or openings which are normally closed by valves 244, 245 located on opposite sides of said partition wall and normally seated by the springs 246, 247. The casing 223 of the double relief valve connected with the telescopic plunger is divided by the partition wall 250 into two chambers 251, 252, the said partition wall having ports or openings normally closed by the oppositely working valves 253, 254, which are normally seated by the springs 255, 256. The cylinder 208 of the relief valve, its outlet pipe 221, and the pipe 217 form a by-pass for the pump, so that the latter may be started in operation without affecting the apparatus.

The operation of the elevating and extensible mechanism may be briefly described as follows: Assume the apparatus in the condition or position represented in Figs. 1 and 2. In this condition, the valve 205 is closed, the valve 204 is open, and the valves 219, 220 may be in the positions shown. The engine 198 may be started in operation while the apparatus is going to a fire or as soon as it arrives there, by opening the valve 205, which admits compressed air into the engine and sets it in motion. The engine starts the pump 197 in operation, which draws liquid from the tank 196 and discharges it through the pipe 207. With the valves 219, 220 in the position shown, the liquid enters the cylinder 208 of the relief valve 225 and forces the latter backward until the outlet pipe 221 is uncovered, whereupon the liquid forced into the cylinder 208 flows therefrom through the pipes 221, 217 into the inlet pipe 206 for the pump, and the liquid is thus circulated without doing work. As the piston valve 225 is moved backward, it operates through the piston rod 227, link 228, lever 229, link 231 and crank or arm 232 to partially close the valve 204, which has the effect of slowing down the engine. Assume that the vehicle has been placed in proper position with relation to the building on fire, which may be with the vehicle backed up against the sidewalk as represented in Fig. 10 or arranged alongside said sidewalk as represented in Fig. 11. Assume also that it is desired to elevate the ladders and extend them to their fullest extent as represented in Fig. 11. To this end, the valve 220 is turned so as to connect the pipe 209 with the pipe 236, which connects the pump 197 with the cylinder 195 and fluid is forced by the pump through the pipes 207, 209 through the valve 220, pipe 236, chamber 242 and pipe 260 into the cylinder 195 behind the piston 194, which is thereby moved in the direction indicated by the arrow 261 toward the opposite end of the cylinder. As the piston 194 is thus moved, the extensible support carrying the ladders is turned on its pivot, and the free end of said support is elevated into a substantially vertical position, whereupon the valve 219 is turned so as to connect the pipe 214 with the telescopic plunger, and on the continued operation of the pump, the liquid is forced into the said plunger through the pipe 216. As the liquid accumulates in the plunger, it moves the movable sections of the plunger and support until further movement is arrested by the stops 70, 71. The valves 219, 220 may then be closed, or they may be left in the position just described, and in either case, the pump may continue to run, for as soon as the telescoping plunger and extensible support have reached the limit of their outward or upward movement, the relief valve 225 is operated by the fluid pressure to open the by-pass referred to, and to throttle the supply of compressed air.

I prefer to close the valves 219, 220, and when so closed, it will be seen that the extensible support and the parts attached to and supported by it, are held in their elevated position by a body of liquid which is locked in the cylinder 195 behind the piston 194 when the valve 220 is in its closed position. It will also be seen that the extensible plunger is filled with an incompressible body of liquid, which is locked therein when the valve 219 is in its closed position. The valve 220 controls the position of the extensible support, which may be turned from the horizontal position shown in Fig. 2 into a vertical position shown in Fig. 7, or it may be turned into any angular position between the horizontal and vertical positions, for instance as represented in Figs. 6 and 10, and in either of these positions said support may be held by closing the valve 220. The telescopic plunger may be moved from its nested position shown in Fig. 7 to that shown in Fig. 11, by opening the valve 219 and connecting the plunger with the pump. The extensible plunger and the parts movable with it may be lowered by turning the valve 219 so as to connect the plunger with the pipe 217 which leads back to the supply tank, and it is evident that by manipulating the valve 219 the extensible plunger may be moved so as to place the working parts movable with said plunger in any desired position with relation to the burning building.

The apparatus when nested as represented in Fig. 7 may be lowered into the position shown in Fig. 2, by turning the valve 220 into the position shown in Fig. 36, so that the liquid is forced by the pump into the cylinder 195 through the pipe 264 and the piston is thereby moved toward the right in said cylinder, the fluid in front of the cylinder in this case being forced back into the supply tank through the pipes 260, 236, 212. The double safety valve connected with the elevating cylinder, safeguards the said cylinder, and the pipes connected therewith against injury in case the valve 220 should be closed too rapidly or accidentally closed. The valve 245 is opened by the increased pressure when the piston 194 is moving in the direction indicated by the arrow 261, thereby permitting the fluid in the chamber 241 to pass into the chamber 242, from which it passes through the pipe 260 into the cylinder behind the piston. The valve 244 is opened by the increased pressure when the piston 194 is moving in the direction opposite to that indicated by the arrow 261. The spring-actuated relief valves 225, 244, 245 and 253 are designed to be brought into operation only when the pressure is considerably greater than that necessary for normal operations.

The double relief valve in the casing 223 safeguards the extensible plunger. For instance, if the valve 219 be suddenly closed while the plunger is descending, the increased fluid pressure would open the valve 253 and allow the liquid to flow back to the pump. If the valve 219 should accidentally be closed while the plunger is moving outward or upward, the relief valve 254 would be opened to permit the flow of liquid from the supply tank into the plunger, the spring 256 for this particular valve being sufficiently light to be overcome by the suction created by the movement of the plunger due to momentum.

The extensible plunger is provided with self-contained safety-devices for preventing injury to the plunger when the latter is stopped in its closed and fully opened positions. These safety devices may be designated upper and lower safety devices. The lower safety devices may be made as herein shown (see Fig. 36) and consist of a block 269 provided with two cones 270, 271 which are designed to fit into the intermediate and smallest sections of the plunger, which sections are provided with stops or projections 272, 273 designed to bottom on the block and leave spaces between the block and the intermediate and innermost sections of the plunger, which form with the spaces between the sides of the cones and the sections 55, 56 a passage, which leads into the innermost section, with which the pipe 216 communicates. When the stops 272, 273 are in proximity to the block 269, the passageway for the liquid from the space beneath the movable sections is gradually restricted, thereby cushioning the descent of the movable sections, which cushioning action is progressive and gradually becomes greater and greater toward the end until the stops engage the block. The upper safety devices consist of conical sleeves 276, 277 attached to the heads of the stationary and intermediate sections, which coöperate with ports or openings 278, 279 in the intermediate and innermost sections 56, 55. The ports 278, 279 permit the escape of liquid imprisoned between the stationary and intermediate sections and between the intermediate and innermost section, when the movable sections of the plunger are rising or being extended. During the major part of their stroke, the fluid escapes freely through the ports 278, 279, but when the said ports approach the conical sleeves 276, 277, the escape of fluid begins to be restricted and as the sections 56, 55 reach substantially the end of their outward movement, the escape of liquid through the said ports is choked, and the movable sections are thereby cushioned and gradually brought to rest, thus avoiding injury to the plunger by a sudden stop.

It will be understood, that the whole system of pipes, cylinders and pumps are normally full of liquid, and that no air-chambers are formed in the system and no cushioning or vibratory effects due to air in the system, with the exception of the air-chamber in the liquid supply tank, which latter is provided with an air vent 200 (see Fig. 36).

Provision is made for obtaining a wide support or foundation for the apparatus in its elevated position. To this end, the vehicle has pivotally secured to its opposite sides near its front end, swing arms 281, each of which is mounted to turn on a vertical axis 282 carried by the vehicle. The swing arms 281 are normally turned into a position alongside or substantially parallel with the vehicle as represented in Fig. 1, but when the apparatus is in use as at a fire, the said arms may be turned into a position substantially at right angles to the body of the vehicle. The swing arms may be locked in their opened or closed positions by suitable means, such as a spring latch or bolt 283 similar to that shown in Fig. 22, which is adapted to enter one of a series of holes 284 in a quadrant plate 285 extended from the sides of the vehicle (see Fig. 1).

The swing arms 281 may be provided at their outer ends with threaded holes or openings which are engaged by threaded rods or screws 286, each carrying a hand-wheel 287 and connected at their lower end to a foot block or plate 288, which is adapted to rest upon the ground, the said screw and plate being connected by a universal joint, such as a ball and socket of any usual construction, which permits the foot block or plate 288 to adjust itself to the ground or other solid foundation.

The screws 286 may be turned so as to lift the weight of the front end of the vehicle from the front wheels, so that the whole weight of the vehicle and its apparatus rests substantially on the points arranged in the form of a T, namely, the two foot plates or blocks and the two rear wheels which are substantially equal to a third point. The ladder 40 attached to the lowermost section 43 of the extensible support, may and preferably will be provided with a movable section 290, (see Fig. 13), to enable the steersman to stand on the platform h carried by the vehicle and arranged substantially in line with the ladder 40 when the latter is in its lowered position.

The movable ladder section 290, may be pivoted to a bracket 291 attached to the section 43 of the extensible support, so that when the said support is in its lowered position shown in Fig. 2, the pivoted ladder section 290 may be thrown back upon the intermediate ladder as represented in Fig. 13. On arriving at a fire, the steersman removes the steering wheel f from the spindle or shaft g and then turns the ladder section 290 so that it alines with and forms a continuation of the lowermost ladder 40, in which position it is preferably automatically locked in any suitable manner. In the present instance, the ladder section 290 is represented in Fig. 13 as provided with an arm 293 which engages a pivoted dog or latch 294 carried by the section 43 of the extensible support.

The working-platform may and preferably will be provided with a guard for each of the trap doors in its floors. In the present instance, I have shown in Fig. 15 a guard for only one of said trap doors. The guard may be of any suitable or desired construction, such for instance, as represented in Figs. 17ª, 17ᵇ, wherein the guard is shown as a U-shaped piece 300, which is hinged to the railing of the platform, and is provided with a spring-actuated bolt 301, which is adapted to engage a striker 302 attached to the railing of the platform. When the trap doors are closed, the guards may hang down against the railing; but when it is desired to use the trap doors, the guards may be turned up into a substantially horizontal position as represented in Figs. 15 and 17ª.

The manner in which the apparatus above described is used, may be briefly set forth as follows: Assume that the apparatus arrives at a fire with the parts in the position represented in Figs. 1 and 2. The apparatus is drawn up alongside the sidewalk as represented in Fig. 11 or is backed up to the sidewalk as represented in Fig. 10. The supporting arms 281 are turned into their operative position represented in Fig. 11 and the foot blocks are adjusted to the ground. The steersman removes the steering wheel and turns the ladder section 290 into line with the ladder. When the bridge is to be used, it may be placed upon the standard or post 97 while the apparatus is in its lowered position, the said bridge in practice lying upon the ladders in their lowered position. The engine and pump are set in motion, and the apparatus is then raised by power as above described. One or more firemen may be raised with the working platform. The apparatus is raised until the working platform is at the desired height. The bridge 100 may be adjusted to a window of a building or it may be the roof or other part of the building. From the working platform, fire may be fought by the stream directed through the nozzle 171 and simultaneously persons rescued from the building may be lowered from the working platform by the fire escape, or they may descend by the extensible ladders. The fire may also be fought from the platforms 80 attached to the ladders. The ladders may be extended or lowered with the firemen on them without danger to the firemen. The working platform affords ample room for a number of firemen to work at the same time.

I have herein shown one form of apparatus which I may prefer, but I do not desire to limit my invention to the particular construction shown.

The platforms 80 are made movable on the ladders to enable them to be moved back so as to clear the driver's seat 400 and not interfere with the driver. The driver's seat 400 and foot-board are rigidly attached to the extensible support and move down in front of the vehicle when the said support is elevated.

The piston 194 of the elevating cylinder is beveled at its ends (see Fig. 36), which beveled ends coöperate with the liquid ports so as to cushion the piston at the end of its stroke in opposite directions.

Claim.

1. In an apparatus of the class described, in combination, a vehicle, an extensible support pivotally mounted thereon and provided with movable sections, an extensible ladder composed of sections connected with the sections of said support and arranged laterally with relation to one another, an extensible plunger located within said extensible support, a working-platform pivotally connected with the innermost section of said support, a bridge pivotally mounted on said platform and extended laterally with relation thereto, a ladder supported by said bridge, mechanism to secure said ladder to said bridge, power-operated mechanism carried by said vehicle to elevate said support and to extend the said plunger and support, and means to control said power-operated mechanism, substantially as described.

2. In an apparatus of the class described, in combination, a vehicle mounted upon wheels, a steering mechanism for one set of said wheels, a ladder arranged in line with said steering mechanism, a support for said ladder pivoted to said vehicle, and a movable ladder section pivoted to said support and forming in its closed or operative position over the said steering mechanism a part of said ladder, substantially as described.

3. In an apparatus of the class described, in combination, a vehicle, an extensible support mounted thereon, a plurality of ladders arranged laterally with relation to one another in substantially the same plane, and means to connect said ladders with said extensible support to move therewith and to form a substantially continuous ladder in their operative position, substantially as described.

4. In an apparatus of the class described, in combination, a vehicle, an extensible support mounted thereon, a plurality of ladders arranged laterally with relation to one another in substantially the same plane and connected to said support, platforms attached to the lower ends of the upper ladders, and means to connect said ladders with said extensible support.

5. In an apparatus of the class described, in combination, a vehicle, an extensible support mounted thereon, a plurality of ladders arranged laterally with relation to one another, platforms affixed to said ladders at their lower ends to slide longitudinally thereon and afford room for the driver's seat when the said ladders are in their lowered position, means to limit the sliding movement of said platforms, and means to connect said ladders with said extensible support, substantially as described.

6. In an apparatus of the class described, in combination, a vehicle, an extensible support mounted on said vehicle and comprising a lower section affixed to the vehicle and one or more movable sections, a plurality of ladders arranged laterally with relation to one another in substantially the same plane, and means to connect said ladders with the sections of the extensible support to form a substantially continuous ladder in the extended position of said support, substantially as described.

7. In an apparatus of the class described, in combination, a vehicle, an extensible support mounted on said vehicle and comprising a lower section affixed to the vehicle and one or more movable sections, a plurality of ladders arranged laterally with relation to one another in substantially the same plane, means to connect said ladders with the sections of the extensible support to form a substantially continuous ladder in the extended position of said support, and platforms carried by the ladders which are connected with the movable sections of the extensible support, substantially as described.

In testimony whereof, I have signed my name to this specification in the presence of two subscribing witnesses.

FREDERIC C. MORTON.

Witnesses:
JAS. H. CHURCHILL,
J. MURPHY.